Dec. 17, 1963

J. ECKERT 3,114,206

MICROMETER CALIPER ATTACHMENT

Filed Feb. 8, 1961

John Eckert
INVENTOR.

BY Clarence A. O'Brien
and Harvey B. Jacobson
Attorneys

United States Patent Office 3,114,206
Patented Dec. 17, 1963

3,114,206
MICROMETER CALIPER ATTACHMENT
John Eckert, 902 Orange, Burlington, Wash.
Filed Feb. 8, 1961, Ser. No. 87,917
3 Claims. (Cl. 33—167)

This invention relates to a novel and useful attachment specifically adapted for use with a micrometer barrel attachment and for providing a means whereby various inside and outside measurements may be taken. The micrometer caliper attachment is provided with a pair of generally parallel and spaced arms interconnected adjacent corresponding ends by means of a rigid support member. One of the arms is pivotally mounted so that its free end may swing toward and away from the free end of the other arm. The side of the pivoted arm remote from the other arm is provided with anvil means adapted for abutting engagement with the spindle of a micrometer barrel assembly fixedly secured relative to the support member and generally paralleling the latter and extending in a direction perpendicular to the axis of rotation of the pivoted arm. The pivoted arm is resiliently urged away from the stationary arm and the spindle of the micrometer barrel assembly comprising a limit stop opposing the means resiliently urging the pivoted arm away from the stationary arm. In this manner, the micrometer barrel assembly may be set at any predetermined setting to provide the desired outside dimension between the free ends of the arms. When utilized as an inside caliper, the arms may be urged together and inserted in a relatively narrow opening and then released in order to measure a counterbore formed within the opening. The exact measurement of the counterbore may then be taken and the arms may be urged toward each other in order to remove the latter from the opening in order that the setting of the micrometer attachment may be measured after the arms have been allowed to move apart with the pivoted arm engaging the setting established by the anvil of the micrometer barrel assembly. Thus, the micrometer caliper attachment may be utilized to measure obstructed inside dimensions. In addition, the pivoted arm and the micrometer barrel assembly may be reversed in position relative to the support member so that the arms will be resiliently urged together and may be utilized for determining outside dimensions.

The micrometer caliper attachment may be utilized to measure internal O-ring and snap ring grooves as well as to measure outside dimensions. During the process of cutting an internal O-ring groove the micrometer caliper attachment is invaluable inasmuch as the micrometer barrel assembly and the attachment could be set for the desired diameter of the internal groove. During the process of cutting the groove, the arms could be resiliently urged together and then allowed to be biased apart to measure the groove during machining operations. The setting of the micrometer barrel assembly may be noted before inserting the outer ends of the arms of the attachment in the internal groove and the micrometer barrel assembly may then be utilized to measure the amount of material which has to be removed before the groove is provided with the desired diameter.

The main object of this invention is to provide a micrometer caliper attachment which may be utilized to make rapid measurements of both internal and external surfaces.

A further object of this invention, in accordance with the immediately preceding object, is to provide a micrometer caliper attachment which will be able to be readily utilized for determining the approximate amount of material which has to be removed in order to complete a cutting or milling operation.

A final object of this invention to be specifically enumerated herein is to provide a micrometer caliper attachment which will conform to conventional forms of manufacture, be of simple construction and easy to operate so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 5:
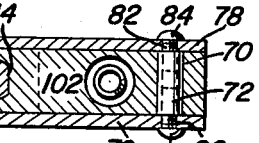
FIGURE 5 is a horizontal fragmentary sectional view taken substantially upon the plane indicated by the section line 5—5 of FIGURE 1.
Figure 3:
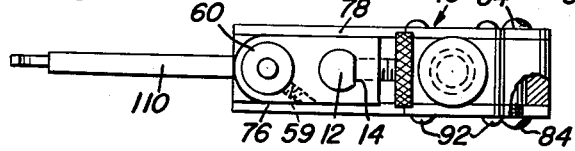
FIGURE 3 is a top plan view of the attachment.

Referring now more specifically to the drawings the numeral 10 generally designates the micrometer caliper attachment of the instant invention which includes a generally cylindrical elongated support rod 12. The support rod 12 is provided with a flat 14 on one side, see FIGURES 3 and 5, and has a first arm means generally referred to by the reference numeral 16 fixedly secured to one end thereof. Arm means 16 projects laterally and outwardly of the support rod 12 to the side thereof remote from the flat 14. The first arm means 16 includes a generally elongated and transversely extending fixture 18 provided with a transverse bore 20 in one end for receiving the lower end of the rod 12. A longitudinal bore 22 is formed in the inner end of the fixture 18 and communicates with the bore 20. A setscrew 24 is threadedly engaged in the bore 22 and is engaged with the rod 12 at its inner end to fixedly secure the fixture 18 to the rod 12. The other end of the fixture 18 is provided with a longitudinal blind bore 26 and a transverse bore 28 communicating with the longitudinal bore 26. The arm means 16 includes an outer end portion generally referred to by the reference numeral 30 comprising an arm member 32 whose inner end is seatingly secured in the longitudinal bore 26 by means of a setscrew 34 threadedly engaged in the transverse bore 28. The outer end of the arm member 32 is provided with an angulated terminal end portion 36.

Mounting means generally referred to by the reference numeral 38 and comprising an elongated mounting member 40 is mounted on the rod 12. The elongated mounting member 40 includes a longitudinal bore 42 which slidably receives the rod 12. The mounting member 40 is provided with a pair of transverse bores 44 and 46 that communicate with the longitudinal bore 42 and have threadedly engaged therein thumb screws 48 and 50 for adjustably positioning the mounting member 40 longitudinally of the rod 12.

The mounting member 40 also includes a laterally projecting mounting boss 52 provided with a bore 54 generally paralleling the bore 42. The head stock 56 of a micrometer barrel assembly generally referred to by the reference numeral 58 may be rigidly secured within the bore 54 in any convenient manner such as by setscrew 59.

The micrometer barrel assembly 58 includes a sleeve 60 and a spindle 62.

Also carried by the mounting member 40 is a laterally projecting mount portion 64 which projects from the side of the mounting member 40 remote from the mounting boss 52. The mount portion 64 is provided with an upwardly opening recess 66 in which there is formed a blind bore 68. The outer end portion of the mount portion 64 is provided with a transverse horizontal bore 70 in which there is disposed an internally threaded sleeve member 72.

A second arm means generally referred to by the reference numeral 74 includes a pair of arm plates 76 and 78 suitably apertured as at 80 and 82 respectively and pivotally secured to the mount portion 64 by means of threaded fasteners 84 passed through the apertures 80 and 82 and secured in the opposite ends of the sleeve 72.

The free ends of the arm plates 76 and 78 extend beyond the mounting member 40 on the side thereof remote from the mount portion 64 and are interconnected by means of connecting block 86. It will be noted that the arm plates 76 and 78 embrace the opposite sides of the mounting member 40 and the mount portion 64. Each of the arm plates 76 and 78 includes an upwardly projecting mounting boss portion 88 and a fixture plate 90 is secured between the mounting boss portions 88 by means of suitable fasteners 92. The fixture plate 90 is provided with a threaded bore 94 in which a retaining cap screw 96 is threadedly engaged. The cap screw 96 has a blind bore 98 formed in the free end of its shank portion 100 and a compression spring 102 is disposed between the closed end of the bore 98 and the closed end of the bore 68 formed in the recess 66. In this manner the free ends of the arm plates 76 and 78 and the connecting block 86 are resiliently urged away from the first arm means 16.

The connecting block 86 is secured between the free ends of the arm plates 76 and 78 by means of fasteners 104 and is provided with a blind longitudinal bore 106 having a transverse bore 108 in communication therewith. The inner end of an arm member 110 is seatingly secured within the blind bore 106 by means of the set screw 112. The outer portion of the second arm means 74 defined by the arm member 110 is also provided with an angulated terminal end portion which is designated by the reference numeral 114. It will be noted that the end portions 36 and 114 are directed away from each other. However, it is to be noted that the arm members 32 and 110 may be rotated about their longitudinal axis and secured in any desired rotated position within the bores 26 and 106, respectively.

Figure 1:
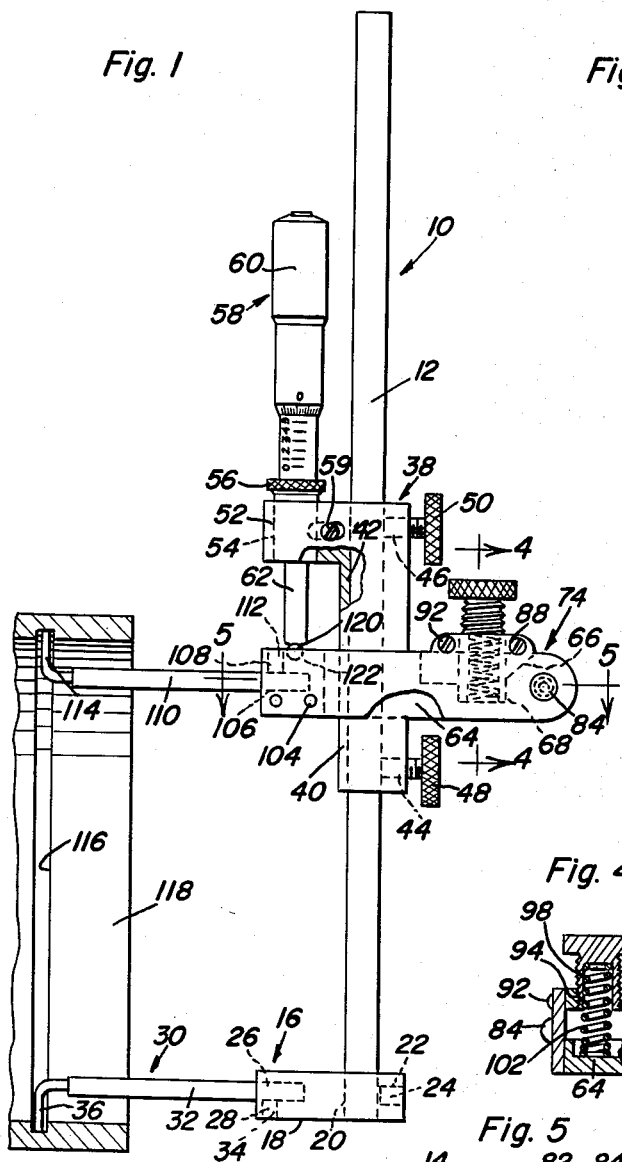
FIGURE 1 is a side elevational view of the micrometer caliper attachment shown with a conventional type of micrometer barrel assembly mounted thereon and being utilized to determine the diameter of an inside groove, parts of the attachment being broken away and shown in section.
Figure 2:
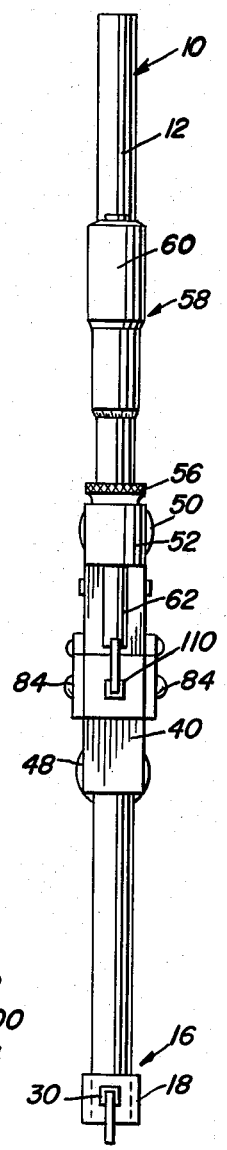
FIGURE 2 is an end elevational view of the attachment as seen from the left side of FIGURE 1.
Figure 4:
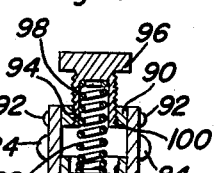
FIGURE 4 is a transverse vertical sectional view taken substantially upon the plane indicated by the section line 4—4 of FIGURE 1.

In operation, if cutting operations are being performed to form the internal groove 116 in the cylindrical member 118, see FIGURE 1, the desired maximum diameter of the groove 116 may be set on the attachment 10 by setting the sleeve 60 of the micrometer barrel assembly 58 in any predetermined position. Then the distance between the free ends of the terminal end portions 36 and 114 may be set to the desired maximum diameter of the groove 116 by adjustably positioning the mounting member 40 on the rod 12. The mounting member 40 may then be fixed relative to the rod 12 by manipulation of the thumb screws 48 and 50. The distance between the outer end portions of the arms 32 and 110 may then be again checked. If this dimension is not found to be exactly the dimension desired, the sleeve 60 of the micrometer barrel assembly 58 may be rotated until the correct dimension is achieved. Then, the setting of the micrometer sleeve 60 is noted. During cutting operations for forming the groove 116, and when it is believed that the groove 116 is approaching the desired maximum dimension, the arm member 110 may be urged toward the arm member 32 until the terminal end portions thereof may be received within the cylindrical member 18. The terminal end portions 36 and 114 are then positioned in the groove 116 and the arm members 32 and 110 are allowed to be biased apart by means of the compression spring 102. The micrometer sleeve 60 may then be turned in order to bring the spindle 62 back into engagement with anvil 120 which is seated in a recess 122 formed in the upper surface of the block 86. The difference between the original setting of the sleeve 60 and the setting of the sleeve 60 when the spindle 62 has been moved into engagement with the anvil 120 is noted and the additional material to be removed during the cutting process for forming the groove 16 may then be determined by this difference. If additional material has to be removed, the arms 32 and 110 may again be urged toward each other in order to retract the attachment from within the cylindrical member 18. The micrometer sleeve 60 may then be returned to its original position and the approximate amount of excess material may be removed. Then, the arm members 32 and 110 may again be engaged with the groove 116 to determine if the amount of material removed was sufficient to give the groove 116 the desired diameter.

Inasmuch as the mounting member is slidably mounted on the rod 12, it may be readily appreciated that its position on the rod may be reversed so that the arm means 74 may be resiliently urged toward the arm means 16. In this instance, the micrometer caliper attachment may be utilized for determining outside dimensions and the arm member 32 is rotated 180 degrees about its longitudinal axis in order that the terminal end portions 36 and 114 will be directed toward one another.

The tension of the compression spring 102 may be adjusted by manipulation of the cap screw 96 whereupon the attachment may be adjusted in order to enable the attachment to be used by machinists having varying degrees of touch. If a particular machinist "mikes hard" the tension of the compression spring 102 may be increased and he "mikes soft," the tension of the compression spring 102 may be reduced.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a micrometer barrel assembly including a spindle, a micrometer attachment comprising an elongated support member, mounting means mounted on said support member for longitudinal adjustment therealong, a lateral mounting boss on said mounting means projecting in a first direction from the mounting means, an elongated laterally projecting mount portion on said mounting means extending in a second direction opposite from said first direction and from the opposite side of the mounting means, said mount portion being in a plane spaced from the plane of said mounting boss, laterally projecting first arm means fixedly carried by one end of said support member and extending in said first direction, second laterally projecting arm means pivotally connected at one end to the outer end of said mount portion, said second arm means extending in said first direction from the point of pivotal connection past a point in longitudinal alignment with the mounting boss, said micrometer barrel assembly being mounted in the mounting boss so as to extend substantially parallel to the support member with the micrometer spindle being disposed for free abutting engagement with the second arm means upon extension of the spindle, and compression spring means engaged between the mount portion and the second arm means at a point between the point of pivotal connection and the mounting means so as to resiliently urge the second arm means toward the spindle.

2. The combination of claim 1 including angular workpiece engaging portions on the free ends of both arm means.

3. The combination of claim 2 including means for varying the effective thrust of the compression spring means.

References Cited in the file of this patent

UNITED STATES PATENTS

| | | |
|---|---|---|
| 758,283 | Shafer | Apr. 26, 1904 |
| 1,109,467 | Robinson | Sept. 1, 1914 |
| 2,212,884 | Polasik | Aug. 27, 1940 |
| 2,467,263 | Krisanda | Apr. 12, 1949 |

FOREIGN PATENTS

| | | |
|---|---|---|
| 282,709 | Great Britain | Mar. 29, 1928 |
| 632,671 | Great Britain | Nov. 28, 1949 |
| 989,358 | France | May 23, 1951 |